(12) United States Patent
Kanai

(10) Patent No.: US 9,703,512 B2
(45) Date of Patent: Jul. 11, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yasunori Kanai, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/991,606

(22) Filed: Jan. 8, 2016

(65) Prior Publication Data

US 2016/0210093 A1 Jul. 21, 2016

(30) Foreign Application Priority Data

Jan. 16, 2015 (JP) .................................. 2015-006741

(51) Int. Cl.
*G06K 15/00* (2006.01)
*G06F 3/12* (2006.01)

(52) U.S. Cl.
CPC ............ *G06F 3/1248* (2013.01); *G06F 3/122* (2013.01); *G06F 3/1285* (2013.01)

(58) Field of Classification Search
None
See application file for complete search history.

(56) References Cited

U.S. PATENT DOCUMENTS 7,894,084 B2 * 2/2011 Chatcavage .......... G06F 3/1219
358/1.13
8,189,221 B2 * 5/2012 Matsumoto ........... G06F 3/1208
358/1.13

(Continued)

FOREIGN PATENT DOCUMENTS

JP 4-227524 8/1992
JP 2004-234130 8/2004

(Continued)

OTHER PUBLICATIONS

Japanese Office Action issued Dec. 13, 2016 during prosecution of related Japanese application No. 2015-006741.

*Primary Examiner* — Dung Tran
(74) *Attorney, Agent, or Firm* — Fitzpatrick, Cella, Harper & Scinto

(57) ABSTRACT

There are provided an image processing apparatus, an image processing method, and a storage medium storing a program for achieving the image processing apparatus and the image processing method. The image processing apparatus according to the present embodiment includes a storage unit configured to store a plurality of processing modules for processing a plurality of types of PDLs; a determination unit configured to determine a type of PDL of a print job; and a processing unit configured to perform processing of enabling at least one processing module corresponding to the determined type of PDL, interpreting a rendering command described in the PDL of the print job by using the at least one processing module that is enabled, and generating page data. The processing unit does not reserve work memory for PDL processing for a type of PDL other than the type of PDL determined by the determination unit.

14 Claims, 15 Drawing Sheets

(56) References Cited

U.S. PATENT DOCUMENTS

| | | | |
|---|---|---|---|
| 8,237,955 B2* | 8/2012 | Mori | G06F 3/1204 358/1.1 |
| 8,274,671 B2 | 9/2012 | Kanai | |
| 8,441,656 B2* | 5/2013 | Miyazaki | G06K 15/02 345/545 |
| 8,614,822 B2* | 12/2013 | Sato | G06K 15/401 345/505 |
| 8,699,041 B2 | 4/2014 | Kanai | |
| 8,810,819 B2* | 8/2014 | Kamoi | H04N 1/00347 358/1.13 |
| 8,810,840 B2* | 8/2014 | Iura | G06F 3/1244 358/1.13 |
| 2008/0137135 A1* | 6/2008 | Takeishi | G06K 15/02 358/1.15 |
| 2008/0307113 A1* | 12/2008 | Suga | G06F 3/1213 709/246 |
| 2009/0244610 A1* | 10/2009 | Mizutani | G06K 15/02 358/1.15 |
| 2010/0123926 A1* | 5/2010 | Kitani | G06K 15/1813 358/1.15 |
| 2012/0293816 A1* | 11/2012 | Bito | G06F 3/1208 358/1.13 |
| 2013/0010319 A1* | 1/2013 | Iura | G06F 3/1244 358/1.13 |
| 2014/0247458 A1* | 9/2014 | Kanai | G06K 15/408 358/1.14 |

FOREIGN PATENT DOCUMENTS

| | | |
|---|---|---|
| JP | 2009-220457 | 10/2009 |
| JP | 2010-176218 | 8/2010 |
| JP | 2012-40833 | 3/2012 |

* cited by examiner

1500

| SUPPORTED PDL | USE FREQUENCY (PROBABILITY OF USE OF PROCESSING MODULE) |
|---|---|
| LIPS | 60% |
| PS | 32% |
| XPS | 8% |

FIG.15

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium storing a program for achieving the image processing apparatus and the image processing method.

Description of the Related Art

In printing text and images created on a computer, various page description languages (PDLs) are known for the computer to provide rendering commands for an image forming apparatus such as a printing apparatus. Examples of typical PDLs include LIPS LX (hereinafter referred to as "LIPS"), PostScript (hereinafter referred to as "PS"), and PDF.

In general, printing apparatuses support printing in a plurality of types of PDLs. The printing apparatuses can interpret rendering commands described in a plurality of types of PDLs and generate page data (bitmap data) based on the rendering commands. Further, the printing apparatuses perform printing processing on the generated page data.

On activation, the printing apparatuses enable all processing mechanisms needed for all PDLs that are supported. Then, the printing apparatuses determine the type of PDL when a print job is received, and perform printing by using a processing mechanism for the PDL needed for the processing of the print job. In Japanese Patent Application Laid-Open No. 2009-220457, for example, there is proposed a printing apparatus that supports a plurality of types of PDLs and performs printing processing by switching a work memory area needed for PDL processing in the event of interrupt printing.

SUMMARY OF THE INVENTION

Some printing apparatuses are so-called low-end printing apparatuses which have limited functions but are available at low prices. Generally, such printing apparatuses are often installed with a limited memory capacity. In such printing apparatuses, as the types of PDLs supported increase, an increased work memory capacity for the PDL processing is needed, resulting in an increase in cost.

An image processing apparatus according to the present invention includes: a storage unit configured to store a plurality of processing modules for processing a plurality of types of PDLs; a determination unit configured to determine a type of PDL of a print job; and a processing unit configured to perform processing of enabling, from the plurality of processing modules stored in the storage unit, at least one processing module corresponding to the type of PDL determined by the determination unit, interpreting a rendering command described in the PDL of the print job by using the at least one processing module that is enabled and work memory reserved for processing the determined PDL, and generating page data, wherein the processing unit does not reserve work memory for PDL processing for a type of PDL other than the type of PDL determined by the determination unit.

Further features of the present invention will become apparent from the following description of exemplary embodiments (with reference to the attached drawings).

BRIEF DESCRIPTION OF THE DRAWINGS

FIG. 15 shows an example of a use frequency table according to the fifth embodiment.

DESCRIPTION OF THE EMBODIMENTS

Embodiments of the present invention will be described with reference to the attached drawings. However, elements described in the embodiments are only exemplary and are not intended to limit the scope of the present invention. Further, all of the combinations of the elements described in the embodiments are not always necessary for a means for solving a problem.

<First Embodiment>

Figure 1:
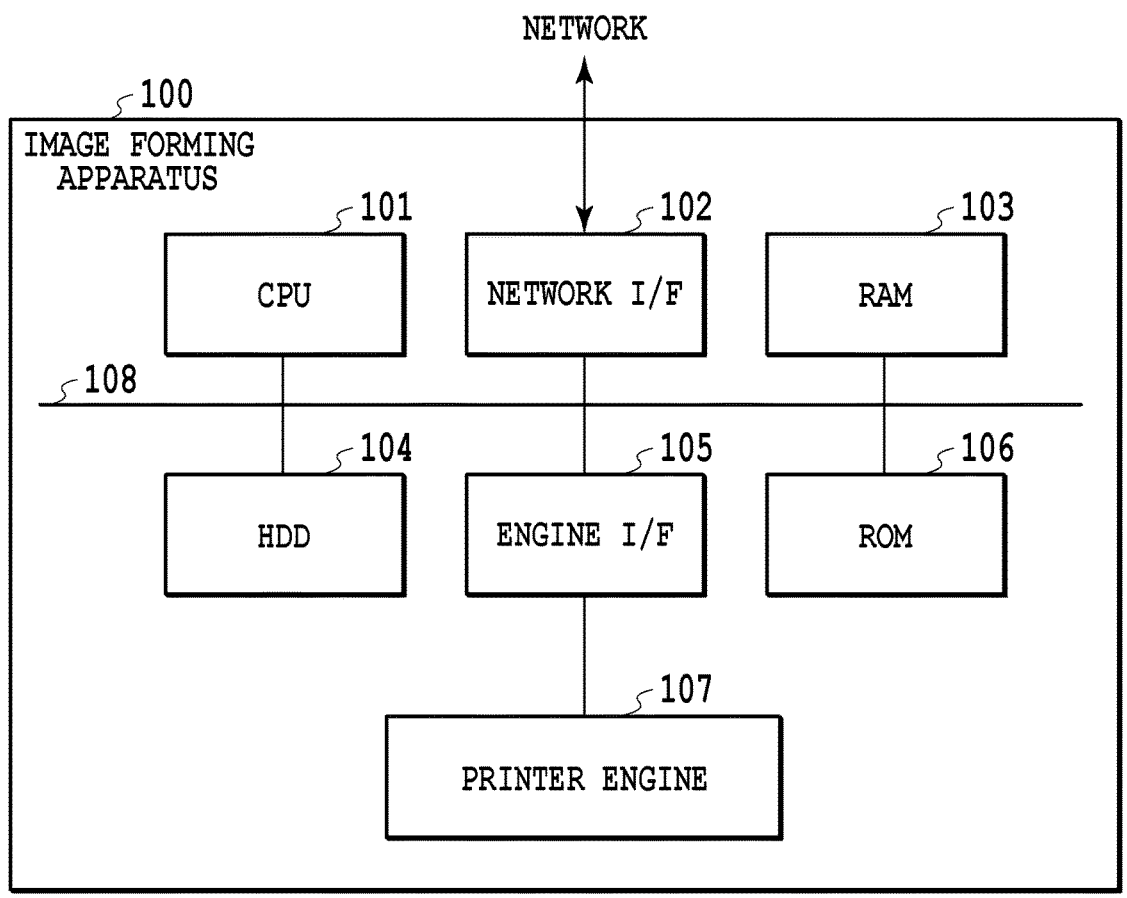
FIG. 1 is a view showing an example of a hardware configuration of an image forming apparatus according to an embodiment.

FIG. 1 is a view showing an example of a hardware configuration of an image forming apparatus 100 according to the present embodiment.

A CPU 101 controls elements of the image forming apparatus 100 via a system bus 108, performs computations, and executes a program stored in a storage unit. The CPU 101 loads a program stored in an HDD 104 into a RAM 103 and executes the loaded program code to implement the functions of the image forming apparatus 100 and the processing according to the flow charts. The RAM 103 is a main memory unit of the image forming apparatus 100 and is used as work memory of the image forming apparatus 100. The HDD 104 is a large-capacity auxiliary storage unit of the image forming apparatus 100 that stores control programs executed by the CPU 101 and is also used as a storage unit that stores data processed by the CPU 101. A ROM 106 is a storage unit of the image forming apparatus 100 that stores an activation processing program of the image forming apparatus 100.

A network interface (hereinafter interface is referred to as an "I/F") 102 is an interface for communicating with a device such as a host computer via a network. An engine I/F 105 communicates with and controls a printer engine 107.

The printer engine 107 forms an image on a physical sheet surface based on an electrophotography or ink jet technique, for example.

Figure 2:
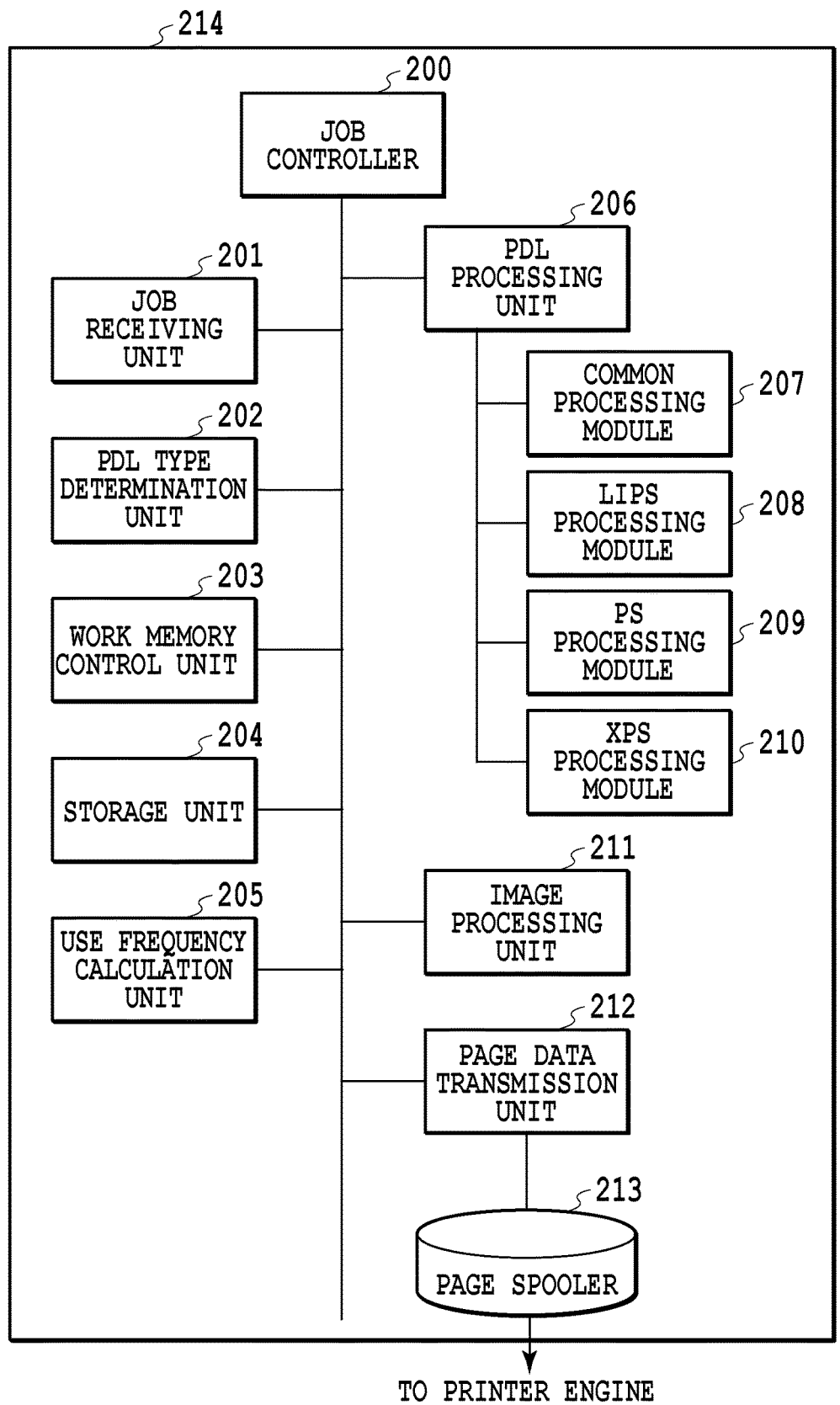
FIG. 2 is a view showing an example of a functional configuration of the image forming apparatus according to the embodiment.

FIG. 2 is a view showing an example of a functional configuration of the image forming apparatus 100 according to the present embodiment. With reference to FIG. 2, a description will be given of the functional configuration of the image forming apparatus 100 according to the present embodiment. In the elements of the image forming apparatus 100 shown in FIG. 2, a program code stored in each storage unit is loaded into the RAM 103 and executed by the CPU 101.

A job controller 200 has control over software elements in the image forming apparatus 100. A job receiving unit 201 receives a print job via the network I/F 102 and stores the received print job in a storage unit 204. The storage unit 204 may be installed on the RAM 103 or installed on the HDD 104. A PDL type determination unit 202 determines which type of PDL is used to describe a rendering command included in the print job.

A work memory control unit 203 is a memory controller in the image forming apparatus 100 and performs memory control such as reserving and releasing work memory. The storage unit 204 is installed on the RAM 103 or the HDD 104 and used as a storage area for storing intermediate data, page data, and non-volatile data generated when each processing module processes a print job. A use frequency calculation unit 205 refers to a processing history of a PDL processing unit 206 stored in the storage unit 204 and calculates a use frequency of each individual processing module for each type of PDL.

The PDL processing unit 206 manages processing modules (a common processing module 207, a LIPS processing module 208, a PS processing module 209, and an XPS processing module 210) for performing PDL processing on a print job. More specifically, the PDL processing unit 206 switches each processing module between enabled and disabled based on an instruction from the job controller 200 (enabling/disabling). Then, the PDL processing unit 206 performs processing of interpreting a rendering command described in a PDL included in the print job by using an enabled processing module, and generating page data (hereinafter generating page data is referred to as "PDL processing").

The term "enabling" in the present embodiment means loading a program related to the processing module stored in the ROM 106 and the like into the RAM 103 and allowing the CPU 101 to be ready to perform PDL processing on the print job. At this time, the job controller 200 causes the work memory control unit 203 to reserve a work memory capacity needed for the enabled processing module. Meanwhile, the term "disabling" in the present embodiment means stopping a program related to the processing module and preventing the CPU 101 from performing PDL processing on the print job. At this time, the job controller 200 causes the work memory control unit 203 to release the work memory reserved by the work memory control unit 203 and retract the program from the RAM 103.

The processing modules of the present embodiment are the common processing module 207, the LIPS processing module 208, the PS processing module 209, and the XPS processing module 210. The common processing module 207 is used for any type of PDL processing. The LIPS processing module 208, the PS processing module 209, and the XPS processing module 210 are individually used for each type of PDL processing. In the following description, the LIPS processing module 208, the PS processing module 209, and the XPS processing module 210 are also collectively referred to as individual processing modules.

An image processing unit 211 performs image processing such as calibration and color conversion on the page data generated by the PDL processing unit 206.

A page data transmission unit 212 stores in a page spooler 213 the page data on which processing is performed by the image processing unit 211 and transmits the page data from the page spooler 213 to the printer engine 107 at an appropriate timing. At this time, the page data transmission unit 212 may also transmit the page data directly to the printer engine 107 without temporarily storing it in the page spooler. Further, the page spooler 213 may be installed on the RAM 103 or installed on the HDD 104. After the page data transmission unit 212 transmits the page data stored in the page spooler 213 to the printer engine and performs printing processing based on the page data received by the printer engine, printing processing in the image forming apparatus 100 is completed.

In the present embodiment, the elements from the job controller 200 to the page spooler 213 make up a controller 214. The controller 214 corresponds to the image processing apparatus of the present invention and may be formed as an independent apparatus separate from the image forming apparatus 100.

Next, a description will be given of a procedure for enabling/disabling processing modules, which is a main part of the present embodiment.

Figure 3:
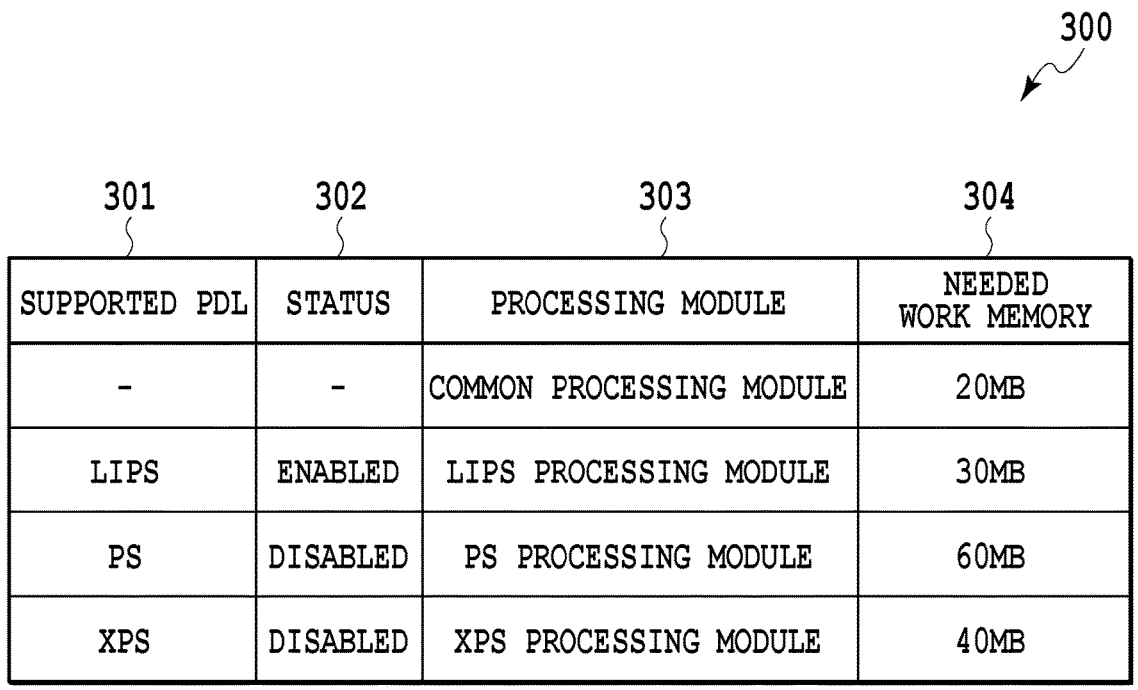
FIG. 3 shows an example of a management table according to the embodiment.

FIG. 3 shows an example of contents of a management table 300 according to the present embodiment. The management table 300 is stored in the storage unit 204 and is referred to when the PDL processing unit 206 controls enabling/disabling of each processing module. In a supported PDL field 301 of the management table 300, the type of PDL supported by each processing module is stored. In a status field 302, information indicating whether each processing module is currently enabled or disabled (whether the PDL processing can be performed) is stored. In a processing module field 303, the type of processing module is stored. In a needed work memory field 304, a work memory capacity needed for each processing module is stored.

Figures 4A, 4B:
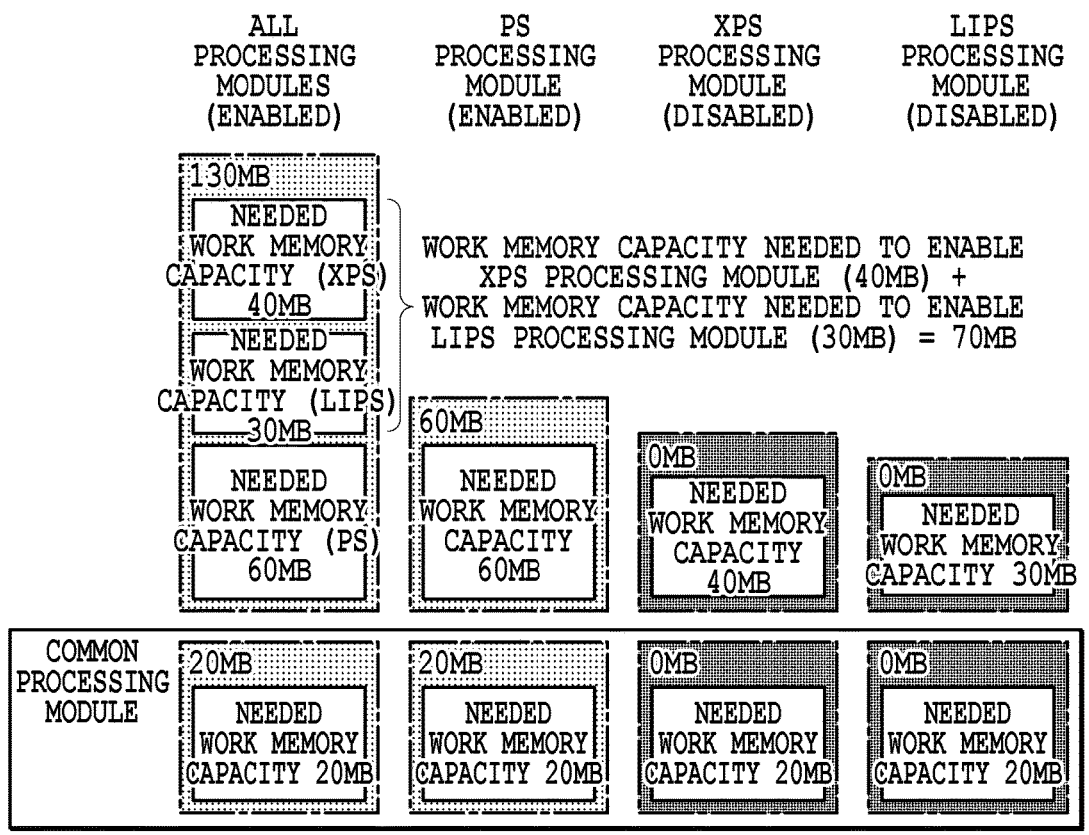
FIG. 4A is a table showing a corresponding relation between enabling/disabling of each processing module and a work memory capacity needed for performing PDL processing.
FIG. 4B is a schematic view showing a work memory capacity needed for performing PDL processing.

FIG. 4A is a table showing a corresponding relation between enabling/disabling of each processing module and a work memory capacity needed for performing PDL processing.

As shown in FIG. 4A, in a case where all individual processing modules are enabled, work memory is needed for all of the common processing module 207 and the individual processing modules. Work memory needed for performing PDL processing is 150 MB. Meanwhile, in a case where only the LIPS processing module 208, for example, is enabled, work memory is needed for both of the common processing module 207 and the LIPS processing module 208. Work memory needed for performing LIPS PDL processing is 50 MB. Likewise, as to the other individual processing modules, in a case where only the PS processing module 209 is enabled, work memory needed for performing PS PDL processing is 80 MB. In a case where only the XPS processing module 210 is enabled, work memory needed for performing XPS PDL processing is 60 MB.

As described above, in a case where all processing modules are enabled at the same time, a work memory capacity of 150 MB is needed for PDL processing, but in a case where the processing module is switched between enabled and disabled depending on the type of PDL, it is possible to suppress a work memory capacity needed for performing PDL processing. In a case where the PS processing module 209 requiring the largest work memory capacity among the individual processing modules is enabled, 80 MB of work memory is needed for performing PDL processing. Meanwhile, in a case where the LIPS processing module 208 is enabled, reserving 50 MB of work memory can operate the LIPS processing module 208 for LIPS PDL processing, so necessary work memory can be covered within 80 MB, which is needed in the case where the PS processing module 209 is enabled. That is, while a work memory capacity of 150 MB is needed in a case where all processing modules are enabled, 70 MB of memory can be saved in the image forming apparatus 100 of the present embodiment because individual processing modules are appropriately switched between enabled and disabled.

FIG. 4B is a schematic view showing the content described above. By way of example, a description will be given of a case where the PS processing module 209 is enabled. The work memory capacity needed for performing PS PDL processing is 80 MB. In a case where the XPS processing module 210 or the LIPS processing module 208 is enabled, since the work memory capacities needed for performing PDL processing of the XPS processing module 210 and the LIPS processing module 208 are 60 MB and 50 MB, respectively, necessary work memory can be covered by 80 MB, which is needed in the case where the PS processing module 209 is enabled. While a work memory capacity of 150 MB is needed for performing PDL processing in a case where all processing modules are enabled at the same time, 70 MB of memory can be saved in the case where only the PS processing module 209 is enabled as compared with the case where all processing modules are enabled at the same time.

Figure 5:
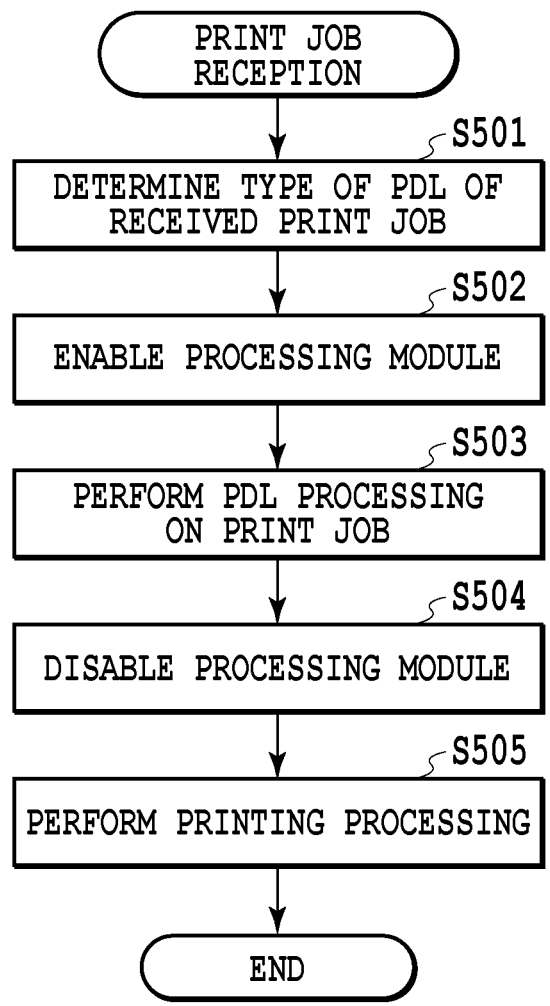
FIG. 5 is a flow chart showing a procedure when a print job is received according to the embodiment.

FIG. 5 is a flow chart showing a procedure when a print job is received according to the present embodiment.

In S501, if the job controller 200 receives a print job, the PDL type determination unit 202 determines the type of PDL of the received print job.

In S502, the job controller 200 instructs the PDL processing unit 206 to enable a processing module corresponding to the type of PDL of the print job. In the present embodiment, the PDL processing unit 206 enables the common processing module 207 and the LIPS processing module 208 and reserves work memory (50 MB) needed for PDL processing.

In S503, the PDL processing unit 206 performs the PDL processing by using the processing modules enabled in S502 and generates page data. In the present embodiment, the PDL processing unit 206 performs the PDL processing on the print job by using the common processing module 207 and the LIPS processing module 208 and generates page data.

In S504, the job controller 200 instructs the PDL processing unit 206 to disable the processing modules that are currently enabled. In the present embodiment, the job controller 200 disables the common processing module 207 and the LIPS processing module 208 and releases 50 MB of work memory reserved for the PDL processing.

In S505, the generated page data is transmitted to the printer engine 107 and printing processing is performed on the transmitted page data.

As described above, the image forming apparatus 100 according to the present embodiment determines the type of PDL of the print job and performs PDL processing by appropriately switching the processing module depending on the type of PDL. Accordingly, as compared with the case where processing modules corresponding to a plurality of types of PDLs are enabled, a necessary work memory capacity can be suppressed, and it is possible to support a plurality of types of PDLs with a less work memory capacity. For example, 150 MB of work memory is needed in a case where all processing modules are enabled, whereas in a case where PDL processing is performed by switching the processing module corresponding to the type of PDL, necessary work memory only needs to be prepared depending on the type of PDL. Accordingly, in the present embodiment, a work memory capacity of 80 MB, which is needed for the PS processing module 209 requiring the largest work memory among the individual processing modules to perform PDL processing, can cover work memory needed for all types of PDL processing.

<Second Embodiment>

A description has been given of the mode in which the image forming apparatus 100 according to the first embodiment determines the type of PDL of the print job and performs PDL processing on the print job by enabling the processing module corresponding to the type of PDL. In the image forming apparatus 100 according to the first embodiment, however, enabling (S502) and disabling (S504) of the processing module is switched every time the print job is received. This may cause overhead of the printing processing in a case where print jobs having the same type of PDL are successively received, or the like.

Figure 6:
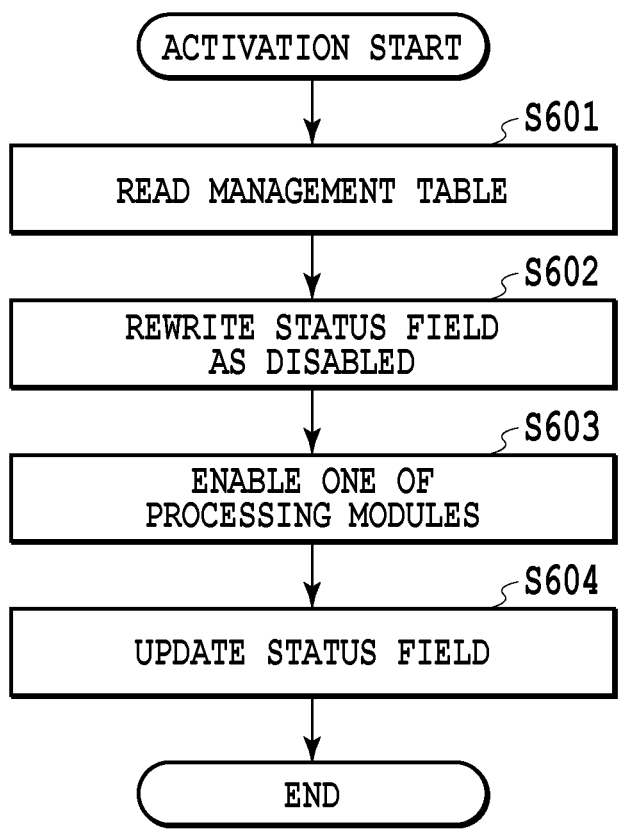
FIG. 6 is a flow chart showing a procedure on activation according to a second embodiment.
Figure 7:
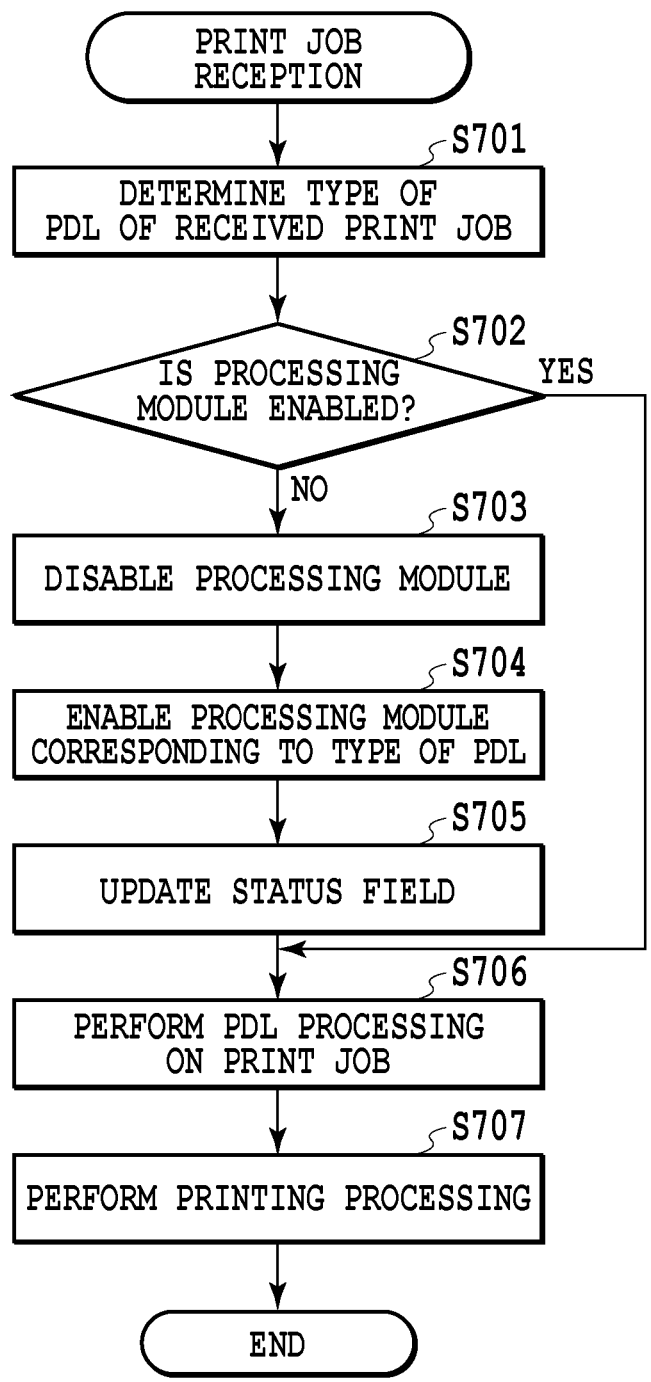
FIG. 7 is a flow chart showing a procedure when a print job is received in the second embodiment.

In an image forming apparatus 100 according to the present embodiment, at least one processing module is enabled during activation of the image forming apparatus 100. Accordingly, for a print job on which the processing module can perform PDL processing, printing processing can be performed without the processing of enabling (S502) and disabling (S504). With reference to FIGS. 6 and 7, the present embodiment will be described.

FIG. 6 is a flow chart showing a procedure on activation of the image forming apparatus 100 according to the present embodiment.

In S601, a job controller 200 reads a management table 300 from a storage unit 204. It should be noted that all processing modules are being disabled on activation of the image forming apparatus 100.

In S602, the job controller 200 rewrites all of status fields 302 in the management table 300 as disabled.

In S603, the job controller 200 selects, from supported PDL fields 301 in the management table 300, one type of PDL and instructs a PDL processing unit 206 to enable a processing module corresponding to the type of PDL. In the present embodiment, the job controller 200 selects LIPS recorded uppermost in the supported PDL fields 301 and instructs the PDL processing unit 206 to enable a LIPS processing module 208. The PDL processing unit 206 enables a common processing module 207 and the LIPS processing module 208 and reserves work memory (50 MB) needed for PDL processing.

In S604, the job controller 200 updates the status field 302 corresponding to the processing module enabled in S603. In the present embodiment, the status field 302 corresponding to the LIPS processing module 208 is rewritten as enabled (FIG. 3).

FIG. 7 is a flow chart showing a procedure when a print job is received in the present embodiment.

In S701, if the job controller 200 receives a print job, a PDL type determination unit 202 determines the type of PDL of the received print job.

In S702, the job controller 200 determines whether the processing module corresponding to the type of PDL of the print job received in S701 is currently enabled or disabled. In the present embodiment, the job controller 200 determines whether the LIPS processing module 208 is currently enabled or disabled. If the LIPS processing module 208 is enabled (S702: Yes), the process proceeds to S706. Meanwhile, if the LIPS processing module 208 is disabled (S702: No), the process proceeds to S703.

In S703, the job controller 200 instructs the PDL processing unit 206 to disable the processing module currently enabled. In the present embodiment, the PDL processing unit 206 disables the LIPS processing module 208 and releases work memory (30 MB) reserved for the PDL processing of the LIPS processing module 208.

In S704, the job controller 200 instructs the PDL processing unit 206 to enable a processing module corresponding to the type of PDL of the print job. In the present embodiment, the PDL processing unit 206 enables a PS processing module 209 and reserves work memory (60 MB) needed for PDL processing of the PS processing module 209.

In S705, the job controller 200 updates the status field 302 corresponding to the processing module enabled in S704. In the present embodiment, the status field 302 corresponding to the LIPS processing module 208 is rewritten as disabled and the status field 302 corresponding to the PS processing module 209 is rewritten as enabled.

In S706, the PDL processing unit 206 performs PDL processing by using the processing modules currently enabled and generates page data. In the present embodiment, the PDL processing unit 206 performs PDL processing on the print job by using the common processing module 207 and the PS processing module 209 and generates page data.

In S707, the generated page data is transmitted to a printer engine 107 and printing processing is performed on the transmitted page data.

As described above, the image forming apparatus 100 of the present embodiment is configured to enable at least one processing module during activation of the image forming apparatus 100. Accordingly, printing processing can be performed without enabling (S502) and disabling (S504) the processing module for the print job on which the processing module can perform PDL processing. Therefore, in addition to the functional effect of the above-described first embodiment, there is produced an effect of reducing overhead of the printing processing due to switching the processing module between enabled and disabled.

Furthermore, a modification example of the second embodiment will be described. In the second embodiment, a description has been given of the example that the PDL processing unit 206 switches individual processing modules 208 to 210. In general, however, one processing module group can often support a plurality of types of PDLs. In the present modification example, a description will be given of a mode in which a group unit of a plurality of processing modules corresponds to a plurality of types of PDLs.

Figure 8:
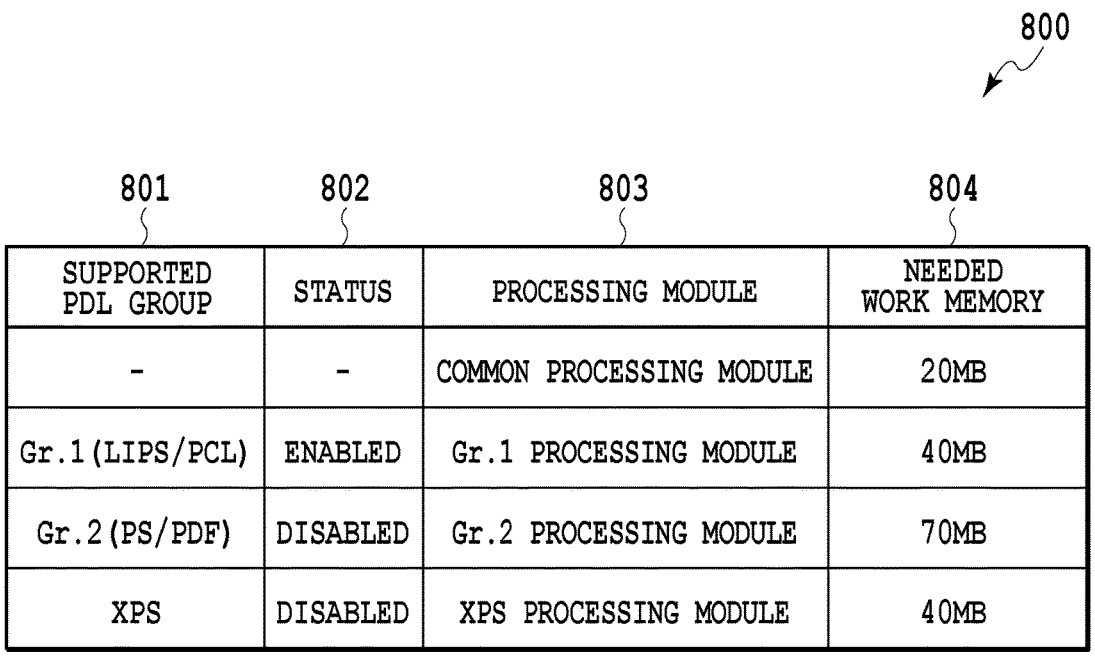
FIG. 8 shows an example of contents of a management table according to a modification example.

FIG. 8 is an example of a management table 800 explaining the modification example of the second embodiment. In supported PDL fields 801, there are recorded a Gr.1 processing module group including a LIPS processing module and a PCL processing module and a Gr.2 processing module group including a PS processing module and a PDF processing module.

In the modification example, as shown in the management table 800 of FIG. 8, the PDL processing unit 206 can switch each processing module group including a plurality of processing modules between enabled and disabled. For example, the PDL processing unit 206 enables the Gr.1 processing module group so as to perform PDL processing on the LIPS print job and the PSL print job.

<Third Embodiment>

Figure 9:
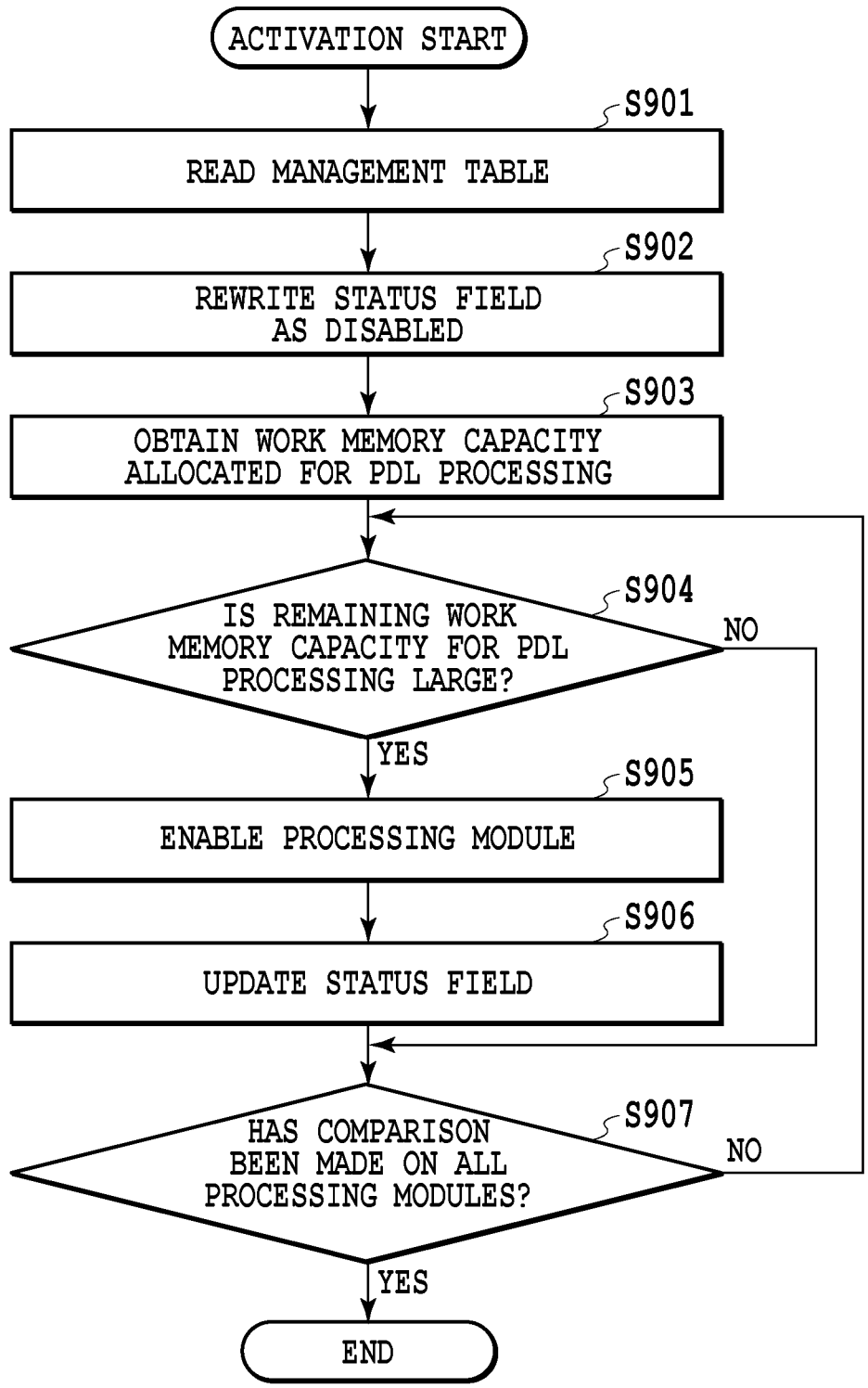
FIG. 9 is a flow chart showing a procedure on activation according to a third embodiment.
Figure 10:
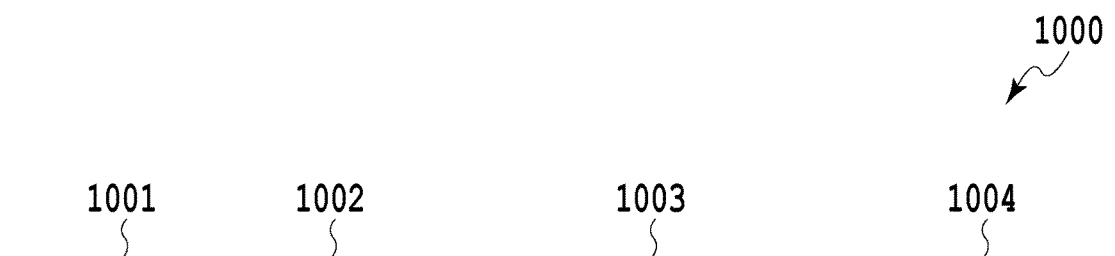
FIG. 10 shows an example of a management table according to the third embodiment.

A description has been given of the mode in which one processing module (processing module group) is always enabled other than the common processing module 207 in the image forming apparatus 100 in the second embodiment. However, a plurality of processing modules may be enabled within a work memory capacity allocated for PDL processing. As the number of enabled processing modules increases, the processing module is less likely to be switched when a print job is received, so overhead of printing processing can be reduced. With reference to FIGS. 9 and 10, the present embodiment will be described.

FIG. 9 is a flow chart showing a procedure on activation of an image forming apparatus 100 according to the present embodiment.

In S901, a job controller 200 reads a management table 300 from a storage unit 204. It should be noted that all processing modules are being disabled on activation of the image forming apparatus 100.

In S902, the job controller 200 rewrites all of status fields 302 in the management table 300 as disabled.

In S903, the job controller 200 obtains a work memory capacity allocated for PDL processing by a work memory control unit 203. In the present embodiment, the job controller 200 obtains 100 MB as a work memory capacity allocated for PDL processing. As used herein, a work memory capacity allocated for PDL processing indicates a maximum work memory capacity available for PDL processing from memory installed in the image forming apparatus 100, and has a value predetermined as a fixed value of the image forming apparatus 100.

In S904, the job controller 200 compares a work memory capacity needed for a processing module with a remaining work memory capacity that can be allocated for PDL processing (hereinafter referred to as "a remaining work memory capacity"). The job controller 200 first obtains one type of PDL from supported PDL fields 301. In the present embodiment, the job controller 200 obtains LIPS recorded uppermost in the supported PDL fields 301. Then, the job controller 200 compares a work memory capacity needed for a LIPS processing module 208 with a remaining work memory capacity. In the present embodiment, the work memory capacity needed for the LIPS processing module 208 is 50 MB in total: 20 MB for a common processing module 207 and 30 MB for the LIPS processing module 208. Meanwhile, the remaining work memory capacity is 100 MB. In the present embodiment, it is determined that the remaining work memory capacity is larger (S904: Yes), so the process proceeds to S905.

In S905, the job controller 200 selects, from the supported PDL fields 301 in the management table 300, one type of PDL and instructs a PDL processing unit 206 to enable a processing module corresponding to the type of PDL. In the present embodiment, the job controller 200 instructs the PDL processing unit 206 to enable the LIPS processing module 208. The PDL processing unit 206 enables the common processing module 207 and the LIPS processing module 208 and reserves work memory (50 MB) needed for PDL processing. At this time, the remaining work memory capacity is 50 MB.

In S906, the job controller 200 updates the status field 302 corresponding to the processing module enabled in S905. In the present embodiment, the status field 302 corresponding to the LIPS processing module 208 is rewritten as enabled.

In S907, the job controller 200 determines whether the comparison processing (S904) has been performed on all processing modules recorded in the supported PDL fields 301 in the management table 300. If it is determined that the comparison processing has not been performed on all processing modules (S907: No), the process goes back to S904.

Again in S904, in the present embodiment, the job controller 200 compares a work memory capacity (60 MB) needed for a PS processing module 209 with the remaining work memory capacity (50 MB). At this time, the remaining work memory capacity (50 MB) is less than the work memory capacity (60 MB) needed for the PS processing module 209, so the job controller 200 determines that it is impossible to instruct to enable the PS processing module 209, and the process proceeds to S907.

Again in S907, the job controller 200 determines whether the comparison processing (S904) has been performed on all processing modules recorded in the supported PDL fields 301 in the management table 300. If it is determined that the comparison processing has not been performed on all processing modules (S907: No), the process goes back to S904.

If the process goes back to S904, in the present embodiment, the job controller 200 compares a work memory capacity (40 MB) needed for an XPS processing module 210 with the remaining work memory capacity (50 MB). At this time, the remaining work memory capacity (50 MB) is larger than the work memory capacity (40 MB) needed for the XPS processing module 210, so the job controller 200 determines that it is possible to instruct to enable the XPS processing module 210, and the process proceeds to S905.

Again in S905, in the present embodiment, the job controller 200 instructs the PDL processing unit 206 to enable the XPS processing module 210. The PDL processing unit 206 enables the XPS processing module 210 and reserves work memory (40 MB) needed for PDL processing. At this time, a remaining work memory capacity is 10 MB.

Again in S906, the job controller 200 updates the status field 302 corresponding to the processing module enabled in S905. In the present embodiment, the status field 302 corresponding to the XPS processing module 210 is rewritten as enabled.

Again in S907, if it is determined that the comparison processing has been performed on all processing modules (S907: Yes), the processing of the flow chart is finished, and the activation processing of the image forming apparatus 100 is completed.

FIG. 10 shows contents of a management table 1000 at the time when the activation processing of the image forming apparatus 100 is completed according to the present embodiment. At this time, it is understood that the status fields 1002 corresponding to the LIPS processing module 208 and the XPS processing module 210 are enabled, and the status field corresponding to the PS processing module 209 is disabled.

Figure 11:
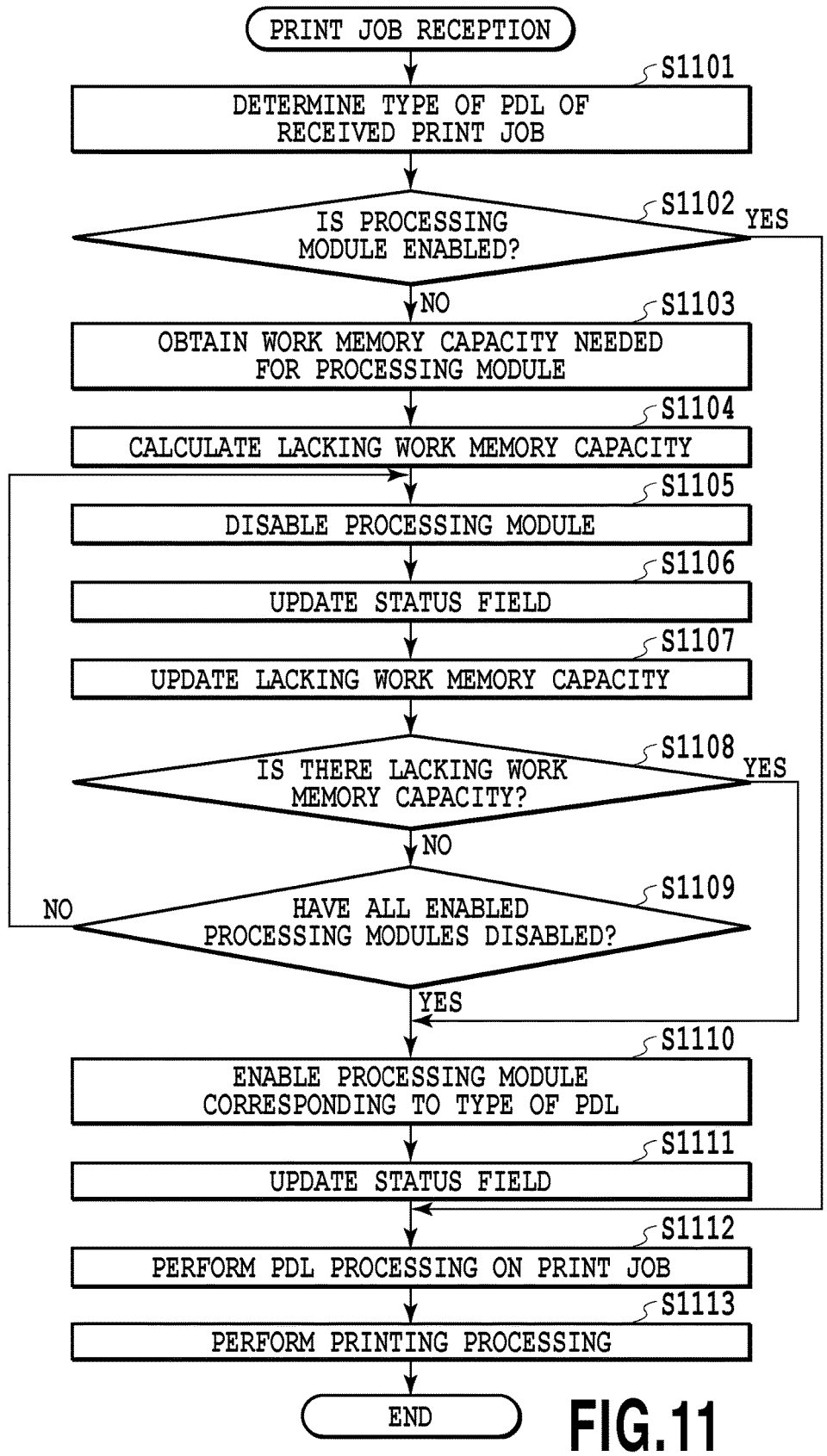
FIG. 11 is a flow chart showing a procedure when a print job is received according to the third embodiment.

FIG. 11 is a flow chart showing a procedure of a print job according to the present embodiment.

In S1101, if the job controller 200 receives a print job, a PDL type determination unit 202 determines the type of PDL of the received print job.

In S1102, the job controller 200 refers to a status field 1002 in the management table 1000 and determines whether a processing module corresponding to the type of PDL of the print job received in S1101 is currently enabled or disabled. In the present embodiment, if the type of PDL of the received print job is LIPS or XPS, since the LIPS processing module 208 and the XPS processing module 210 are enabled (S1102: Yes), the process proceeds to S1112. Meanwhile, if the type of PDL of the received print job is PS, since the PS processing module 209 is disabled (S1102: No), the process proceeds to S1103.

In S1103, the job controller 200 obtains from the management table 1000 a work memory capacity (60 MB) needed for the PS processing module 209.

In S1104, the job controller 200 obtains a remaining work memory capacity from the work memory control unit 203 and calculates a work memory capacity in which the processing module determined to be disabled in S1102 is lacking (hereinafter referred to as "a lacking work memory capacity"). In the present embodiment, the job controller 200 obtains a remaining work memory capacity (10 MB) from the work memory control unit 203 and calculates a lacking work memory capacity (50 MB) by subtracting the remaining work memory capacity (10 MB) from the work memory capacity (60 MB) needed for the PS processing module 209.

In S1105, the job controller 200 instructs the PDL processing unit 206 to disable the processing module currently enabled. In the present embodiment, the PDL processing unit 206 disables the LIPS processing module 208 and releases 30 MB of work memory reserved for PDL processing.

In S1106, the job controller 200 updates the status field 1002 corresponding to the processing module disabled in S1105. In the present embodiment, the status field 1002 corresponding to the LIPS processing module 208 is rewritten as disabled.

In S1107, the job controller 200 updates the lacking work memory capacity. In the present embodiment, the work memory (30 MB) needed for the PDL processing of the LIPS processing module 208 is subtracted from the lacking work memory capacity (50 MB) before disabling the LIPS processing module 208, and then the lacking work memory capacity is updated to 20 MB.

In S1108, the job controller 200 determines whether there is a lacking work memory capacity. In the present embodiment, the lacking work memory capacity is 20 MB (S1108: No), so the process proceeds to S1109.

In S1109, the job controller 200 determines whether the disabling processing (S1105) has been performed on all enabled processing modules recorded in the supported PDL fields 1001 in the management table 1000. If it is determined that disabling has not been performed on all enabled processing modules (S1109: No), the process goes back to S1105.

Again in S1105, the job controller 200 instructs the PDL processing unit 206 to disable the processing module currently enabled. In the present embodiment, the PDL processing unit 206 disables the XPS processing module 210 and releases 40 MB of work memory reserved for PDL processing.

Again in S1106, the job controller 200 updates the status field 1002 corresponding to the processing module disabled in S1105. In the present embodiment, the status field 1002 corresponding to the XPS processing module 210 is rewritten as disabled.

Again in S1107, the job controller 200 updates the lacking work memory capacity. In the present embodiment, the work memory (40 MB) needed for the PDL processing of the XPS processing module 210 is subtracted from the lacking work memory capacity (20 MB) before disabling the XPS processing module 210, and then the lacking work memory capacity is updated to −20 MB.

Again in S1108, the job controller 200 determines whether there is a lacking work memory capacity. In the present embodiment, there is no lacking work memory capacity (S1108: Yes), so the process proceeds to S1110.

In S1110, the job controller 200 instructs the PDL processing unit 206 to enable the processing module corresponding to the type of PDL of the print job. In the present embodiment, the PDL processing unit 206 enables the PS processing module 209 and reserves work memory (60 MB) needed for PDL processing.

In S1111, the job controller 200 updates the status field 1002 corresponding to the processing module enabled in S1110. In the present embodiment, the status field 1002 corresponding to the PS processing module 209 is rewritten as enabled.

In S1112, the PDL processing unit 206 performs PDL processing by using the processing module currently enabled and generates page data. In the present embodiment, the PDL processing unit 206 performs the PDL processing on the print job by using the common processing module 207 and the PS processing module 209 and generates page data.

In S1113, the generated page data is transmitted to a printer engine 107 and printing processing is performed on the transmitted page data.

In the present embodiment, a description has been given of the processing content of enabling as many processing modules as possible within a work memory capacity allocated for PDL processing. Further, in the present embodiment, a description has also been given of the processing content in a case where a remaining work memory capacity that can be allocated for PDL processing falls below a work memory capacity needed for the processing module corresponding to the type of PDL of the received print job. At this time, the job controller 200 disables the currently enabled processing module so that the remaining work memory capacity is not less than the work memory capacity needed for the processing module corresponding to the type of PDL of the received print job.

In the present embodiment, as the number of enabled processing modules increases, the processing module is less likely to be switched when a print job is received, so overhead of printing processing can be reduced, thereby producing an effect of improving printing efficiency.

<Fourth Embodiment>

A description has been given of the mode of enabling at least one processing module on activation of the image forming apparatus 100 in the second embodiment. In the present embodiment, a description will be given of a mode of an image forming apparatus 100 in which a processing module that was enabled at the last shutdown is enabled on next activation.

Figure 12:
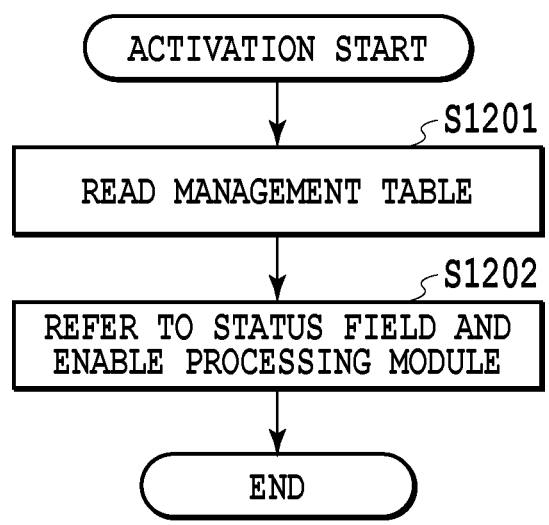
FIG. 12 is a flow chart showing a procedure on activation according to a fourth embodiment.

FIG. 12 is a flow chart showing a procedure on activation of the image forming apparatus 100 according to the present embodiment.

In S1201, a job controller 200 reads a management table 300 from a storage unit 204.

In S1202, the job controller 200 refers to a status field 302 of the management table 300 and instructs a PDL processing unit 206 to enable the processing module that is being enabled. In the present embodiment, the job controller 200 refers to the status field 302 of the management table 300 and instructs the PDL processing unit 206 to enable a LIPS processing module 208 that is being enabled. If the PDL processing unit 206 enables the LIPS processing module 208, activation of the image forming apparatus 100 is completed.

As stated above, a description has been given of the mode of enabling, on next activation, the processing module that was enabled at the last shutdown in the image forming apparatus 100 according to the present embodiment. This configuration can maintain the enabled status of the processing module suitable for user environment before shutdown and after completion of activation of the image forming apparatus 100.

<Fifth Embodiment>

A description has been given of the mode of enabling a plurality of processing modules within a work memory capacity allocated for PDL processing in the image forming apparatus 100 according to the third embodiment. At this time, in the image forming apparatus 100 according to the third embodiment, the processing modules are enabled in order of the supported PDL fields 1001 in the management table 1000. To reduce switching of the plurality of processing modules and to reduce overhead of the printing processing, it is effective to give a higher priority to enabling a processing module corresponding to the type of PDL having a high use frequency. Likewise, it is also effective to give a higher priority to disabling a processing module corresponding to the type of PDL having a low use frequency. In an image forming apparatus 100 according to the present embodiment, a description will be given of a mode of enabling/disabling a processing module depending on a use frequency of a processing module for each type of PDL. In the following description, the present embodiment will be described with reference to FIGS. 13 and 14, but the descriptions of portions overlapping with the previously described embodiments will be omitted.

Figure 13:
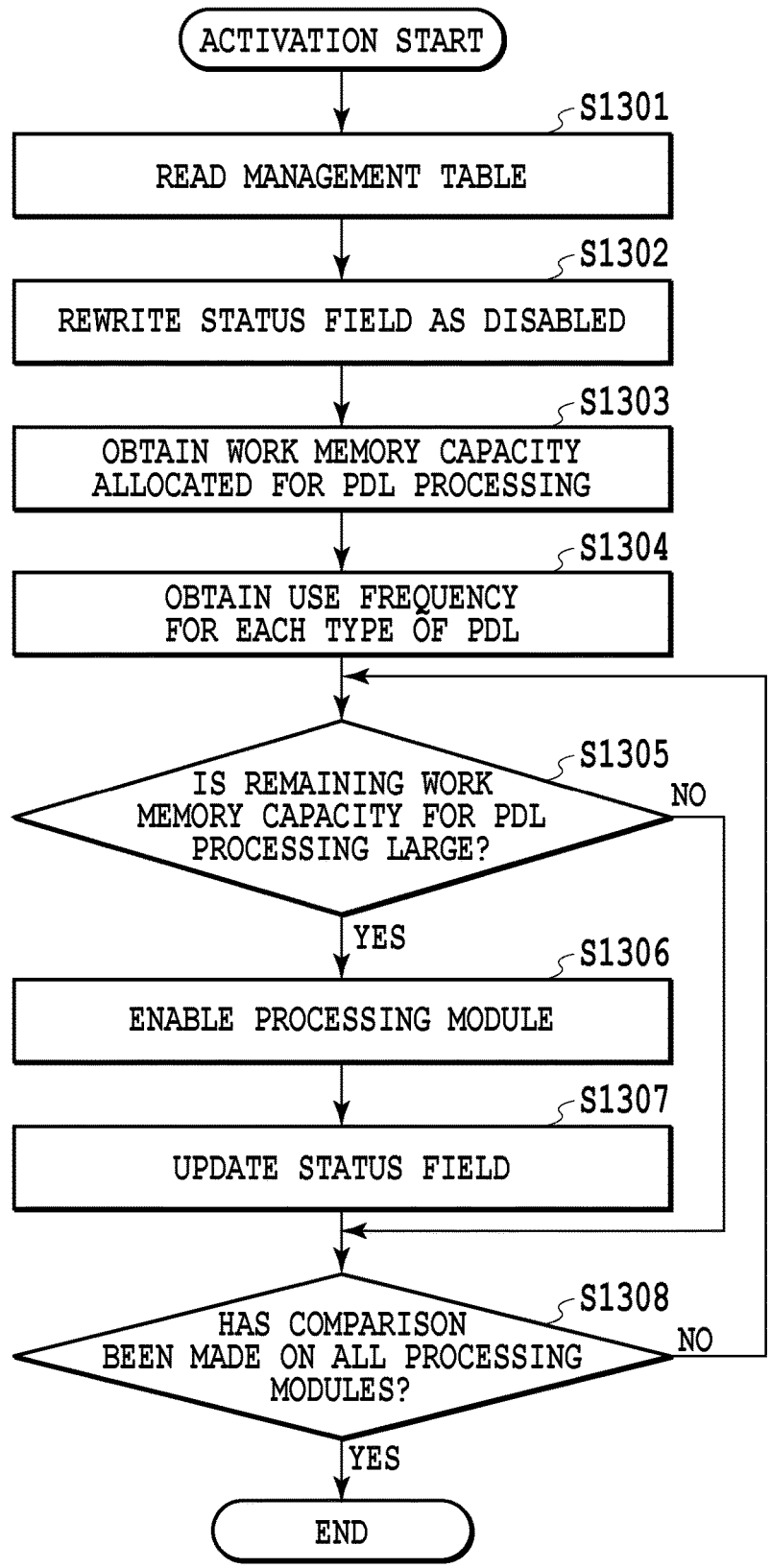
FIG. 13 is a flow chart showing a procedure on activation according to a fifth embodiment.

FIG. 13 is a flow chart showing a procedure on activation of the image forming apparatus 100 according to the present embodiment. S1301 to S1303 are the same steps as S901 to S903 in the flow chart of FIG. 9.

In S1304, a job controller 200 obtains from a storage unit 204 a use frequency table 1500 for each type of PDL. The use frequency table 1500 is stored in the storage unit 204 and calculated from a processing history of a PDL processing unit 206. By referring to the use frequency table 1500, the job controller 200 can refer to a probability of use of each individual processing module by the PDL processing unit 206.

With reference to FIG. 15, a description will be given of an example of the use frequency table 1500 in the present embodiment. The use frequency table 1500 is a data table in which the type of PDL supported by the image forming apparatus 100 is associated with a probability of use of a processing module by the PDL processing unit 206 and recorded. In the present embodiment, a probability of use of a LIPS processing module 208 is 60% of the total, a probability of use of a PS processing module 209 is 32% of the total, and a probability of use of an XPS processing module 210 is 8% of the total.

S1305 to S1308 are processing of the job controller 200 to enable individual processing modules within a work memory capacity allocated for PDL processing like S904 to S907 in the flow chart of FIG. 9. In S1305 to S1308, the job controller 200 refers to the use frequency table 1500 and determines whether to disable a processing module in decreasing order of a probability of use. The processing other than the above is performed in the same manner as the one shown in the flow chart of FIG. 9.

Figure 14:
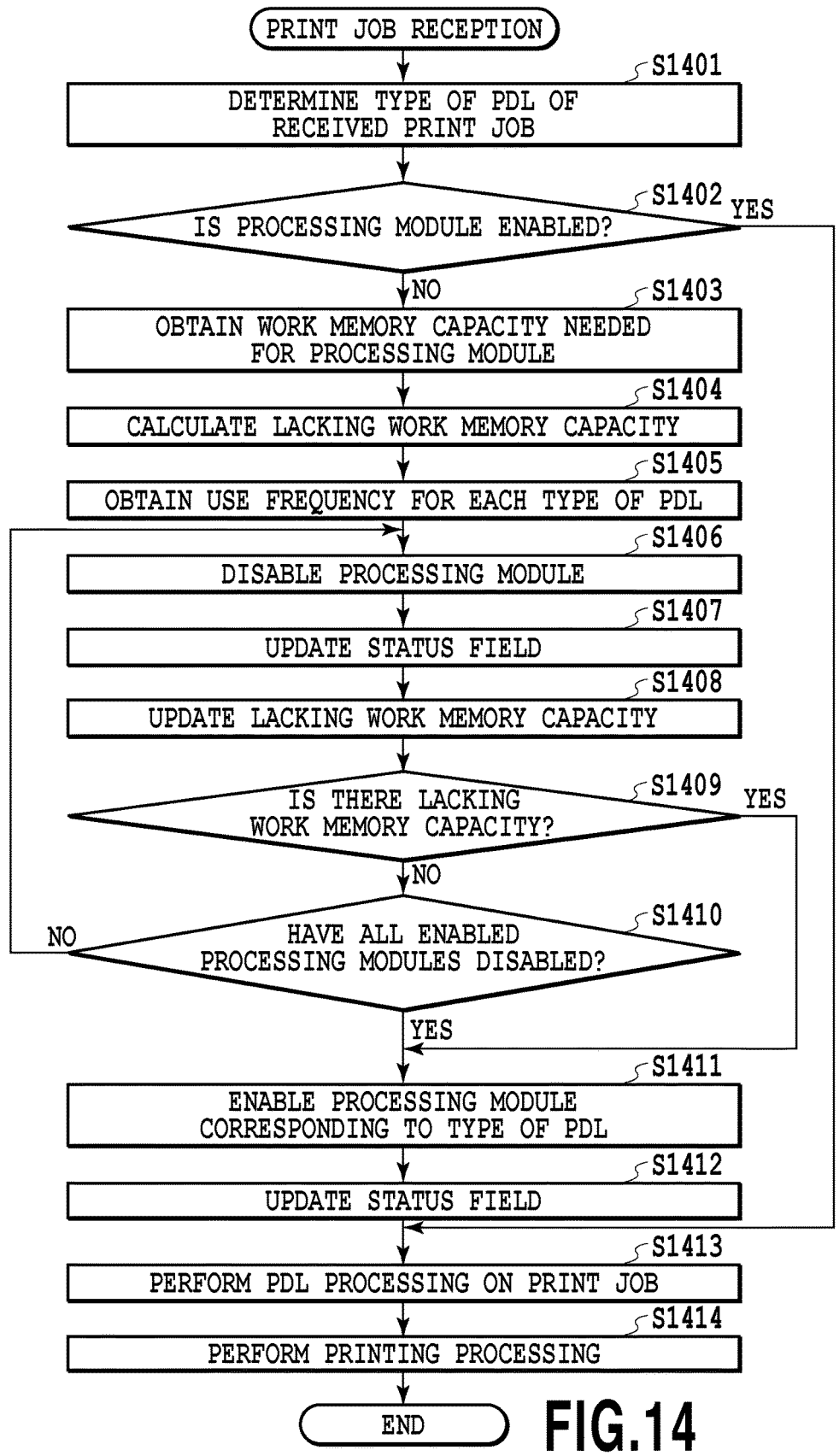
FIG. 14 is a flow chart showing a procedure when a print job is received according to the fifth embodiment.

FIG. 14 is a flow chart showing a procedure of a print job according to the present embodiment. S1401 to S1404 are the same steps as S1101 to S1104 in the flow chart of FIG. 11.

In S1405, the job controller 200 obtains the use frequency table 1500 from the storage unit 204.

S1406 to S1410 are processing of the job controller 200 to perform PDL processing only on the enabled processing modules and to disable the processing modules until there is no more lacking work memory capacity, like S1105 to S1109 in the flow chart of FIG. 11. In S1406 to S1410, the job controller 200 refers to the use frequency table 1500 and determines whether to disable a processing module in increasing order of a probability of use. The processing other than the above is performed in the same manner as the one shown in the flow chart of FIG. 11.

As described above, the image forming apparatus 100 according to the present embodiment gives a higher priority to enabling a processing module corresponding to the type of PDL having a high use frequency and gives a higher priority to disabling a processing module corresponding to the type of PDL having a low use frequency. Accordingly, it is possible to enable a processing module corresponding to the type of PDL having a high use frequency and reduce a frequency of switching the processing module when a print job is received and thus reduce overhead of printing processing, thereby producing an effect of improving the efficiency of printing.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

An image forming apparatus of the present invention determines the type of PDL of a print job when the print job is received and performs PDL processing by switching processing modules according to the type of PDL. This configuration can support a plurality of types of PDLs with a less work memory capacity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-006741, filed Jan. 16, 2015, which is hereby incorporated by reference wherein in its entirety.

What is claimed is:

1. An image processing apparatus comprising:
a processor and a memory storing a computer program that, when executed by the processor, causes the processor to function as:
a storage unit configured to store a plurality of groups of processing modules, at least one of the groups including a plurality of processing modules for processing a plurality of types of PDLs (Page Description Languages);
a determination unit configured to determine a type of PDL of a print job; and
a processing unit configured to be able to perform processing of enabling, from the plurality of groups stored in the storage unit, at least one group including a processing module corresponding to the type of PDL determined by the determination unit and another processing module corresponding to a different type of PDL from the determined type of PDL, by at least reserving work memory for the one group, interpreting a rendering command described in the PDL of the print job by using the processing module that corresponding to the type of PDL determined by the determination unit and the work memory reserved for processing the determined type of PDL, and generating page data,
wherein the processing unit disables a group different from the one group based on the determination by at least releasing work memory reserved for the different group.

2. The image processing apparatus according to claim 1, wherein when the print job is received, the processing unit enables, by at least reserving the work memory for the one group including the processing module corresponding to the type of PDL determined by the determination unit and the another processing module corresponding to the different type of PDL from the determined type of PDL.

3. The image processing apparatus according to claim 1, wherein when the print job is received, in a case where a work memory capacity that can be allocated for PDL processing falls below a work memory capacity needed for processing the PDL determined by the determination unit, the processing unit disables, by at least releasing work memory reserved for the different group, the different group that is enabled.

4. The image processing apparatus according to claim 1, wherein on next activation, the processing unit enables a same group as a group that was enabled at last shutdown.

5. The image processing apparatus according to claim 1, further comprising a use frequency calculation unit configured to calculate a use frequency of each of the plurality of groups from a processing history of the processing unit,
wherein on activation, the processing unit enables a group having a high use frequency from the plurality of groups.

6. The image processing apparatus according to claim 1, further comprising a use frequency calculation unit configured to calculate a use frequency of each of the plurality of groups from a processing history of the processing unit,
wherein when a print job is received, the processing unit disables a group having a low use frequency from the plurality of groups.

7. An image processing method executed by a processor of an image processing apparatus, the method comprising the steps of:
storing a plurality of groups of processing modules, at least one of the groups including a plurality of processing modules for processing a plurality of types of PDLs (Page Description Languages);

determining a type of PDL of a print job; and performing processing of enabling, from the plurality of groups stored in the storing step, one group including a processing module corresponding to the type of PDL determined in the determining step and another processing module corresponding to a different type of PDL from the determined type of PDL, by at least reserving work memory for the one group, interpreting a rendering command described in the PDL of the print job by using the processing module that corresponds to the type of PDL determined in the determining step and the work memory reserved for processing the determined type of PDL, and generating page data, wherein in the processing step, a group different from the one group is disabled based on the determination by at least releasing work memory reserved for the different group.

8. A non-transitory computer readable storage medium storing a program for causing a computer to function as an image forming apparatus, where the program comprises:

code for a storage step of storing, in a storage unit, a plurality of groups of processing modules, at least one of the groups including a plurality of processing modules for processing a plurality of types of PDLs (Page Description Languages);

code for a determination step of determining a type of PDL of a print job; and code for a processing step of performing processing of enabling, from the plurality of groups stored in the storage unit, one group including a processing module corresponding to the type of PDL determined by the determination step and another processing module corresponding to a different type of PDL from the determined type of PDL, by at least reserving work memory for the one group, interpreting a rendering command described in the PDL of the print job by using the processing module that corresponds to the type of PDL determined by the determination step and the work memory reserved for processing the determined type of PDL, and generating page data, wherein the processing step disables a group different from the one group based on the determination by at least releasing work memory reserved for the different group.

9. An image processing apparatus comprising:

a processor and a memory storing a computer program that, when executed by the processor, causes the processor to function as:

an enabling unit configured to enable one group of processing modules including at least one processing module for processing at least one PDL (Page Description Language), by at least reserving work memory for the one group;

a type determination unit configured to receive a print job and determine a type of PDL of the received print job;

an enabling determination unit configured to determine whether a processing module corresponding to the type of PDL determined by the type determination unit is enabled by the enabling unit;

a processing unit configured to perform, in a case where the enabling determination unit determines that the processing module corresponding to the type of PDL determined by the type determination unit is enabled by the enabling unit, processing of interpreting a rendering command described in the PDL of the print job by using the processing module that is enabled, and generating page data, and to perform processing of, in a case where the enabling determination unit determines that the processing module corresponding to the type of PDL determined by the type determination unit is not enabled by the enabling unit, disabling, by at least releasing the reserved work memory, the one group enabled by the enabling unit, and enabling a group including the processing module corresponding to the type of PDL determined by the type determination unit by at least reserving work memory needed for processing the determined type of PDL.

10. The image processing apparatus according to claim 9, wherein, in a case where the enabling determination unit determines that the processing module corresponding to the type of PDL determined by the type determination unit is enabled by the enabling unit, the processing unit interprets a rendering command described in the PDL of the print job by using the processing module that is enabled and the reserved work memory and generates page data.

11. The image processing apparatus according to claim 9, wherein the enabling unit enables, on next activation, a same group as a group enabled by the enabling unit at last shutdown.

12. The image processing apparatus according to claim 9, wherein the enabling unit enables the at least one group for processing the at least one PDL so that a total work memory capacity needed for processing at least one PDL is within a work memory capacity allocated for PDL processing.

13. An image processing method executed by a processor of an image processing apparatus, the method comprising the steps of:

enabling one group of processing modules including at least one processing module for processing at least one PDL (Page Description Language), by at least reserving work memory for the one group;

a type determination step of receiving a print job and determining a type of PDL of the received print job;

an enabling determination step of determining whether a processing module corresponding to the type of PDL determined in the type determination step is enabled in the enabling step;

performing, in a case where it is determined, in the enabling determination step, that the processing module corresponding to the type of PDL determined in the type determination step is enabled in the enabling step, processing of interpreting a rendering command described in the PDL of the print job by using the processing module that is enabled, and generating page data, and performing processing of, in a case where it is determined, in the enabling determination step, that the processing module corresponding to the type of PDL determined in the type determination step is not enabled in the enabling step, disabling, by at least releasing the reserved work memory, the one group enabled in the enabling step, and enabling a group including the processing module corresponding to the type of PDL determined in the type determination step by at least reserving work memory needed for processing the determined type of PDL.

14. A non-transitory computer readable storage medium storing a program for causing a computer to function as an image forming apparatus, where the program comprises:

code for an enabling step of enabling one group of processing modules including at least one processing module for processing at least one PDL (Page Description Language), by at least reserving work memory for the one group;

code for a type determination step of receiving a print job and determining a type of PDL of the received print job;

code for an enabling determination step of determining whether a processing module corresponding to the type of PDL determined by the type determination step is enabled by the enabling step; and code for a processing step of performing, in a case where the enabling determination step determines that the processing module corresponding to the type of PDL determined by the type determination step is enabled by the enabling step, processing of interpreting a rendering command described in the PDL of the print job by using the processing module that is enabled, and generating page data, and performing processing of, in a case where the enabling determination step determines that the processing module corresponding to the type of PDL determined by the type determination step is not enabled by the enabling step, disabling, by at least releasing the reserved work memory, the one group enabled by the enabling step, and enabling a group including the processing module corresponding to the type of PDL determined by the type determination step by at least reserving work memory needed for processing the determined type of PDL.

* * * * *